(No Model.)
J. ECKLES & J. P. FROW.
CHURN.
No. 327,928. Patented Oct. 6, 1885.
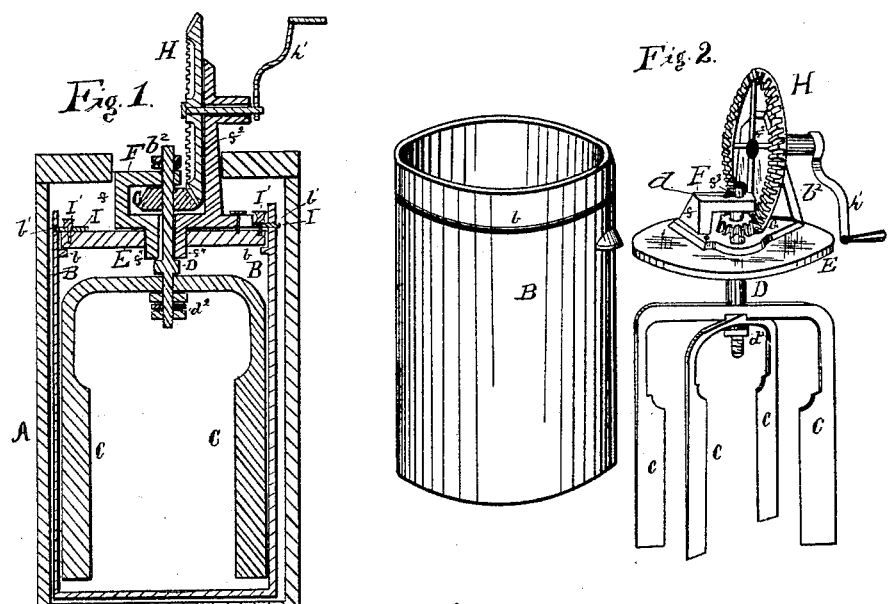
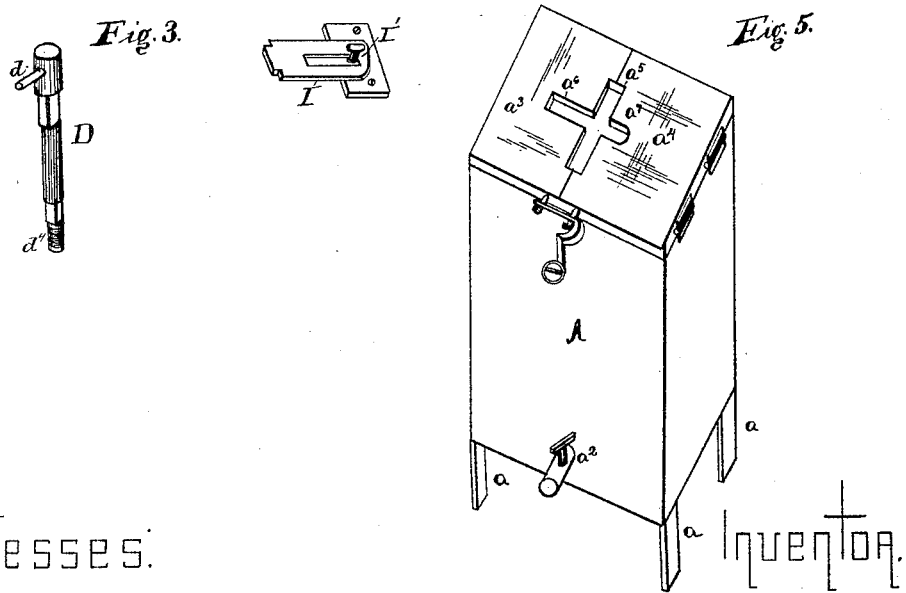
Witnesses:
F. M. Clarke.
S. H. F. Clarke.
Inventor.
James Eckles &
James P. Frow.
By S. A. Haseltine & Bro.
Attorneys.
N. PETERS. Photo-Lithographer, Washington, D. C.

UNITED STATES PATENT OFFICE.

JAMES ECKLES AND JAMES P. FROW, OF BUTLER, MISSOURI.

CHURN.

SPECIFICATION forming part of Letters Patent No. 327,928, dated October 6, 1885.

Application filed May 21, 1885. Serial No. 166,254. (No model.)

*To all whom it may concern:*

Be it known that we, JAMES ECKLES and JAMES P. FROW, citizens of the United States, residing at Butler, in the county of Bates and State of Missouri, have invented certain new and useful Improvements in Churns; and we do hereby declare the following to be a full, clear, and exact description of the invention, such as will enable others skilled in the art to which it appertains to make and use the same.

Our invention relates to improvements in churns, the object of which is to provide a cheap, simple, and durable device for churning or obtaining butter in a short time and for freezing cream, and also at the same time a device that is easily cleaned and operated. These objects we attain by means of the device illustrated in the accompanying drawings, forming a part of this specification, in which—

Figure 1 is a longitudinal section of the device. Fig. 2 is a view in elevation of the device. Figs. 3, 4, and 5 are detailed views. Fig. 5 shows the case A empty.

Similar letters of reference indicate corresponding parts in the several figures.

The invention consists in the construction, combination, and arrangement of parts, as hereinafter set forth, and pointed out in the claim.

A is an outer vessel or case, of any desired size and shape, for holding warm or cool water to bring the cream in the inner vessel to the desired temperature.

$a$ are legs to support the vessel or case, which has a faucet, $a^2$, for drawing off the encircling fluid when desired, and a cover, $a^3 a^4$, having grooves or notches $a^5 a^6 a^7$, to receive and firmly support the upper part of the frame F.

B is an inner case or vessel, preferably made cylindrical and with thin walls, which are preferably tin or a good conductor of heat, for equalizing the temperature or quickly freezing the cream. Said vessel B has a cover that fits closely in the top upon a shoulder, $b$, and is secured in place by a fastening formed by slotted pieces I, provided with thumb-screws I', said vessel B having openings or holes $b'$, to receive the pieces I when put out for firmly holding the cover in place.

F is a support, provided with an upright, $f^2$, for supporting the drive-wheel H and winch $h'$. The part $a^4$ of the upper cover has a notch to closely fit this upright. Said support also has an arm, $f$, with suitable bearings for a shaft, D. The part $a^3$ of the upper cover has notches to receive and closely fit around this arm to firmly support the same. Said support has a sleeve to fit down through the cover E to steady the shaft D, on which is placed a pinion, G, between the bearings $f^3$ in the arm $f$ and $f^4$ in the sleeve. Said support F is attached to the cover E by bolts or other suitable means.

D is a shaft supported by a pin, $d$, or head above the arm $f$. Said shaft is placed down through the arm $f$, pinion G, and sleeve $f^4$, and has an end to enter the paddles or dashers C. For this purpose it is provided with square shoulders and a nut, $d^2$, with screw-threads, to tighten the dashers, near the top of the churn. Dashers C are preferably four in number, formed of two pieces at right angles, one extending out nearly to the sides of the inner vessel, the other but a short distance from the middle. Thence they extend downward nearly to the bottom of the vessel; and are made wide and thin, and may be perforated as desired.

H is a drive or cog wheel operated by a winch, which is made to operate outside of the outer vessel, and by means of the pinion G drives the paddles C, thus thoroughly stirring the cream while it is in the desired temperature to churn or freeze, and at the same time a device easily cleaned, as everything is removed from the inner vessel with its cover; also a churn that is perfectly clean on the outside in churning, as it has two covers, each closely and firmly secured in place.

Having thus described our invention, what we claim as new, and desire to secure by Letters Patent, is—

In a churn, the combination, with a vessel, A, having a cover, $a^3 a^4$, with notches $a^5 a^6 a^7$, of a vessel, B, having shoulders $b$, holes $b'$, catches I, cover E, support F, drive-wheel H, having a winch, $h'$, shaft D, pinion G, and paddles C, all arranged and constructed to operate substantially as and for the purpose set forth.

In testimony whereof we affix our signatures in presence of two witnesses.

JAMES ECKLES.
JAMES P. FROW.

Witnesses:
WILLIAM A. LONG,
STEPHEN A. ECKLES.